United States Patent
Tanabe et al.

(10) Patent No.: US 11,283,364 B2
(45) Date of Patent: Mar. 22, 2022

(54) POWER SUPPLY AND POWER SYSTEM HAVING A STEP-DOWN CIRCUIT AND AN INVERSE-CONVERSION CIRCUIT

(71) Applicant: FANUC CORPORATION, Yamanashi (JP)

(72) Inventors: Yoshikiyo Tanabe, Yamanashi (JP); Satoshi Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/789,166

(22) Filed: Feb. 12, 2020

(65) Prior Publication Data
US 2020/0287474 A1 Sep. 10, 2020

(30) Foreign Application Priority Data

Mar. 5, 2019 (JP) .............................. JP2019-039562

(51) Int. Cl.
*H02M 5/45* (2006.01)
*H02M 5/458* (2006.01)
(Continued)

(52) U.S. Cl.
CPC ......... *H02M 5/4585* (2013.01); *H02M 7/537* (2013.01); *H02J 3/381* (2013.01);
(Continued)

(58) Field of Classification Search
CPC . H02M 2001/0074; H02M 2001/0077; H02M 7/00–81; H02P 27/06; H02J 3/381; H02J 5/00
(Continued)

(56) References Cited

U.S. PATENT DOCUMENTS 5,946,208 A * 8/1999 Yamamoto ............. A61B 6/488
363/132
10,651,739 B1 * 5/2020 Li ........................ H02M 3/1582
(Continued)

FOREIGN PATENT DOCUMENTS

JP S62-268367 A 11/1987
JP H05-260787 A 10/1993
(Continued)

OTHER PUBLICATIONS

An Office Action; "Notice of Reasons for Refusal", mailed by the Japanese Patent Office dated May 11, 2021, which corresponds to Japanese Patent Application No. 2019-039562 and is related to U.S. Appl. No. 16/789,166; with English language translation.

*Primary Examiner* — Rafael O De Leon Domenech
(74) *Attorney, Agent, or Firm* — Studebaker & Brackett PC (57) ABSTRACT

A power supply according to the present disclosure includes: a step-down circuit which has at least one pair of positive/negative step-down switching elements; at least one pair of positive/negative inductors to which voltage is applied via the step-down switching element, and one pair of positive/negative output capacitors which are connected in series and charged by electrical current passing through the inductor, and steps down input voltage and then outputs; an inverse-conversion circuit which has a plurality of inverse-conversion switching elements, and inverse-converts output voltage of the step-down circuit into alternating current; and a control circuit which controls switching of the plurality of step-down switching elements so that the output voltage of the step-down circuit becomes a desired voltage.

7 Claims, 6 Drawing Sheets

(51) Int. Cl.
  *H02M 7/537* (2006.01)
  *H02P 27/06* (2006.01)
  *H02M 1/00* (2006.01)
  *H02J 5/00* (2016.01)
  *H02J 3/38* (2006.01)

(52) U.S. Cl.
  CPC .............. *H02J 5/00* (2013.01); *H02M 1/0074* (2021.05); *H02M 1/0077* (2021.05); *H02P 27/06* (2013.01)

(58) Field of Classification Search
  USPC ......................................................... 323/267
  See application file for complete search history.

(56) References Cited

U.S. PATENT DOCUMENTS

| | | | | |
|---|---|---|---|---|
| 2004/0183460 | A1* | 9/2004 | Van Casteren | .... H05B 41/2925 315/209 R |
| 2011/0148370 | A1* | 6/2011 | Mizutani | ............... H02M 3/158 323/271 |
| 2018/0323707 | A1* | 11/2018 | Yuyama | ................ H02M 7/493 |

FOREIGN PATENT DOCUMENTS

| | | |
|---|---|---|
| JP | 2008-072880 A | 3/2008 |
| JP | 2017-093202 A | 5/2017 |
| JP | 2018-074794 A | 5/2018 |
| WO | 2007/096994 A1 | 8/2007 |

\* cited by examiner

POWER SUPPLY AND POWER SYSTEM HAVING A STEP-DOWN CIRCUIT AND AN INVERSE-CONVERSION CIRCUIT

This application is based on and claims the benefit of priority from Japanese Patent Application No. 2019-039562, filed on 5 Mar. 2019, the content of which is incorporated herein by reference.

BACKGROUND OF THE INVENTION

Field of the Invention

The present invention relates to a power supply and a power system.

Related Art

Conventionally, devices using an electric motor that is driven by an AC power source in an industrial application (industrial machine) have been widely used. The voltage of the AC power source which can be utilized by the user, i.e. voltage of an on-premise electrical distribution system, may differ according to the user. Generally, in Japan, although there are many cases where on-premise electrical distribution is done in three-phase alternating current at 200 V AC, there are many examples in other countries where an electrical distribution system on the order of 380 V AC to 480 V AC is used, for example. In addition, there are also cases where voltages of the on-premise electrical distribution system differ according to the configuration of the power receiving equipment, even in the same country.

For example, with an industrial robot or the like, various sizes, number of axes, and system configurations exist, and the power source voltages which can be utilized by the user also vary, and changing the layout of devices to match specific voltages is not easy. In addition, when changing the layout of devices for every voltage, inconveniences arise in that the maintenance also becomes complicated. For this reason, in the case of the voltage of the power source which can be utilized by the user differing from the voltage of the existing devices, it is often handled by installing a voltage transformer between the power source and device. However, when using a voltage transformer, the size and weight of the device increase, as well as the cost increasing.

In addition, with an industrial robot or the like, in order to drive servomotors, for example, a power supply which forward-converts AC to DC, and then inverse converts to AC of a desired frequency has been utilized, as disclosed in Patent Document 1. In this case, it has been considered to be able to obtain the optimum output voltage for the motor irrespective of the power supply voltage, by transforming the direct current. In other words, if adding a chopper circuit to the DC portion of the power supply disclosed in Patent Document 1, it would be possible to adjust the outputted AC voltage.

In addition, in recent years, the use of renewable energy such as solar power generation is expanding, and there is a possibility of DC power being supplied. The voltage is set for every system also in the case of DC power.

Patent Document 1: Japanese Unexamined Patent Application, Publication No. 2018-74794

SUMMARY OF THE INVENTION

From an AC 380 V to AC 480 V power source which is neutral grounded often used overseas, an AC power which can control a motor for AC 200 V, can be obtained by converting voltage by a chopper circuit. In this case, when reconverting to three-phase alternating current by an inverse conversion circuit, the neutral point of the three-phase AC power which is outputted may become a different potential from the earth potential.

If the neutral point of the alternating current outputted greatly differs from the earth potential, a high dielectric voltage relative to earth becomes necessary in the load circuit such as a servomotor, and it may not be possible to use due to a dielectric strength voltage deficiency. In addition, if the neutral point potential greatly differs from the earth potential, the switching noise becomes large and the risk of malfunction increases.

In addition, with a power supply for driving a servomotor, a large peak current including higher harmonics during servomotor acceleration flows, and a rise in capacity of the facility power supply becomes necessary. Although technology for power factor improvement and suppressing peak current has been developing as countermeasures, since it leads to higher cost and increased size for realization, it cannot be easily applied.

Taking into account the above such situation, a power supply which can output alternating current of any voltage and any frequency has been demanded.

A power supply according to the present disclosure includes: a step-down circuit which has at least one pair of positive/negative step-down switching elements; at least one pair of positive/negative inductors to which voltage is applied via the step-down switching element, and one pair of positive/negative input capacitors which are connected in series and charged by electrical current passing through the inductor, and steps down input voltage and then outputs; an inverse-conversion circuit which has a plurality of inverse-conversion switching elements, and inverse-converts output voltage of the step-down circuit into alternating current; and a control circuit which controls switching of the plurality of step-down switching elements so that the output voltage of the step-down circuit becomes a desired voltage.

The power supply according to the present disclosure can output alternating current of any voltage and any frequency.

DETAILED DESCRIPTION OF THE INVENTION

Figure 1:
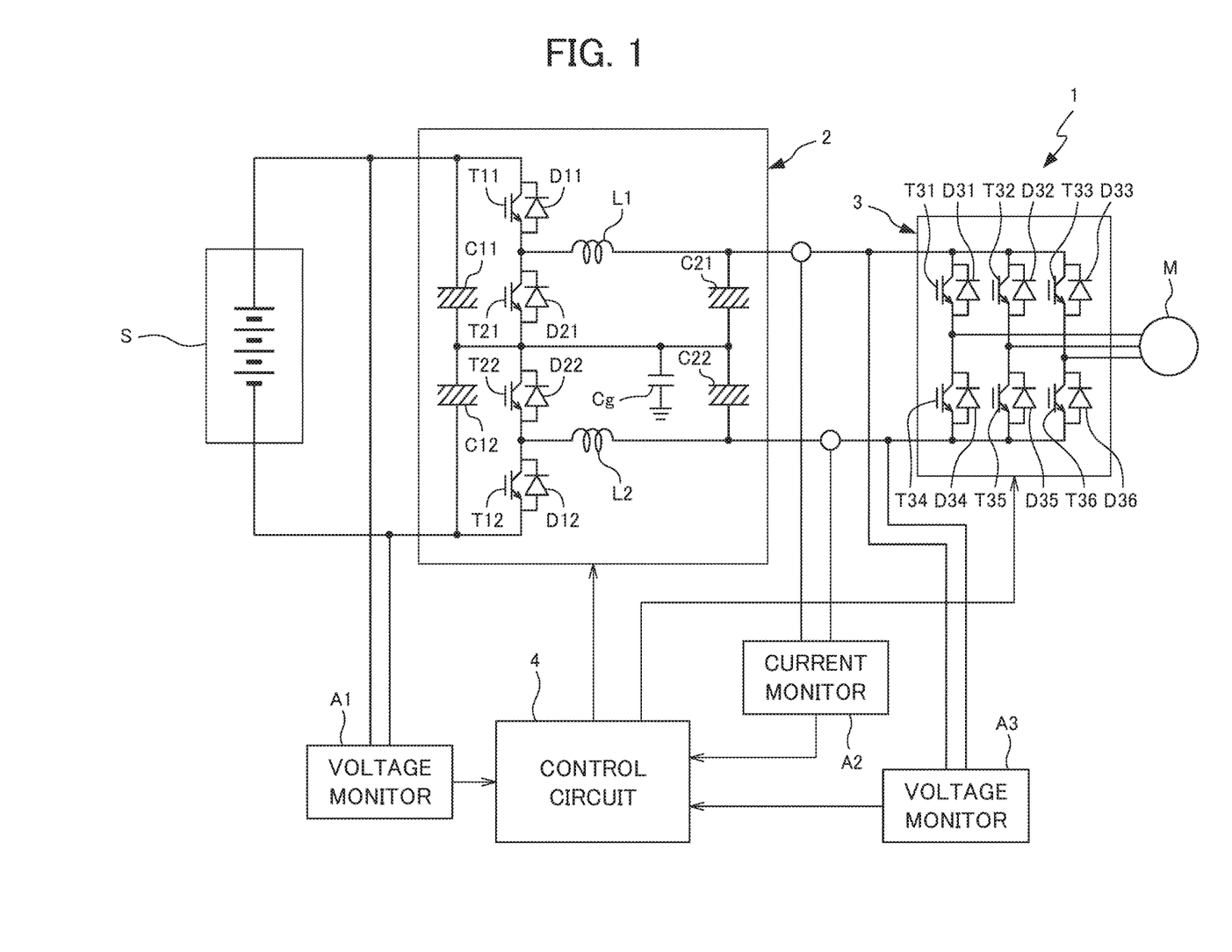
FIG. 1 is a circuit diagram showing the configuration of a power supply according to a first embodiment of the present disclosure.

Each embodiment of the present disclosure will be explained below while referencing the drawings. FIG. 1 is a circuit diagram showing the configuration of a power supply 1 according to a first embodiment of the present disclosure.

The power supply 1 is a device which supplies (powered running) a load (motor M in the present embodiment), by converting the direct current supplied from a primary power source (DC power source S) into three-phase alternating current of a predetermined voltage. In more detail, the power supply 1 is connected to a primary power source S having higher voltage than the rated voltage of the motor M, and supplies the motor M by converting the three-phase alternating current of the primary power source S into three-phase alternating current having voltage equal to the rated voltage of the motor M and frequency equal to the frequency set by external equipment or a user. In addition, the power supply 1 of the present embodiment is configured so as to be able to convert the three-phase alternating current supplied from the motor M in the reverse direction into direct current having the same voltage as the primary power source S, and supply (regenerative running) to the primary power source S.

As the primary power source S supplying direct current to the power supply 1, it is assumed to include an electrical storage device such as a rechargeable battery. In other words, the primary power source S is configured as a system which can supply power to the power supply 1, and can store electrical power supplied in the reverse direction from the power supply 1.

The power supply 1 includes: a step-down circuit 2 which steps down the voltage inputted from the primary power source S and then outputs; an inverse conversion circuit 3 which outputs alternating current of a desired frequency by inverse converting the output of the step-down circuit 2 into alternating current; and a control circuit 4 which controls the step-down circuit 2 and inverse conversion circuit 3.

The step-down circuit 2 includes: a pair of positive/negative input capacitors (input capacitor C11 charged by positive voltage, input capacitor C12 charged by negative voltage) connected to each other in series and charged by a primary power source S; a pair of positive/negative step-down switching elements (step-down switching element T11 to which positive voltage is applied, step-down switching element T12 to which negative voltage is applied) to which the voltage of the input capacitors C11, C12 is applied; a pair of positive/negative inductors (inductor L1 to which positive voltage is applied via the step-down switching element T11 on the positive side, inductor L2 to which negative voltage is applied via the step-down switching element T12 on the negative side) to which voltage is applied via the step-down switching elements T11, T22; a pair of positive/negative output capacitors (output capacitors C21 charged by the inductor L1 on the positive side, output capacitor C22 charged by the inductor L2 on the negative side) which are connected to each other in series and charged by electrical current passing through the inductors L1, L2; a pair of boosting switching elements (boosting switching element T21 connecting the intermediate point of the step-down switching element T11 on the positive side and the inductor L1 to the intermediate point of the output capacitors C21, C22; boosting switching element T22 connecting the intermediate point of the step-down switching element T12 on the negative side and the inductor L2 to the intermediate point of the output capacitors C21, C22) able to connect between the step-down switching element T11, T22 and the inductor L1, L2 to the intermediate point of the pair of output capacitors C21, C22; a pair of bypass diodes (bypass diode D11 provided in parallel to the step-down switching element T11 on the positive side, bypass diode D12 provided in parallel to the step-down switching element T12 on the negative side) which is provided in parallel to the step-down switching elements T11, T12 and can flow electrical current in the inverse direction; a pair of protective diodes (protective diode D21 provided in parallel to the boosting switching element T21 on the positive side, protective diode D22 provided in parallel to the boosting switching element T22 on the negative side) provided in parallel to the boosting switching elements T21, T22 and can flow electrical current in the inverse direction; and grounding capacitor Cg which grounds the intermediate point of the input capacitors C11, C12 and intermediate point of the output capacitors C21, C22.

The pair of input capacitors C11, C12 can respectively be configured by one or a plurality of capacitors, and the capacities are the same as each other. The pair of output capacitors C21, C22 can similarly also be respectively configured by one or a plurality of capacitors, and the capacities are the same as each other. The step-down switching elements T11, T22 and the boosting switching elements T21, T22, for example, can be configured by semiconductor switching elements such as the FET illustrated, and the ON/OFF state is controlled by the control circuit 4 described later. The pair of inductors L1, L2 can respectively be configured by one or a plurality of coils, and the inductances are the same as each other. The bypass diodes D11, D12 and protective diodes D21, D22 protect the step-down switching elements T11, T12 and the boosting switching elements T21, T22 from inverse voltage, and can be omitted depending on the type of step-down switching elements T11, T12 and boosting switching elements T21, T22.

The inverse-conversion circuit 3 has: a plurality of inverse-conversion switching elements (inverse-conversion switching element T31 which outputs positive voltage of the first phase; inverse-conversion switching element T32 which outputs positive voltage of the second phase; inverse-conversion switching element T33 which outputs positive voltage of the third phase; inverse-conversion switching element T34 which outputs negative voltage of the first phase; inverse-conversion switching element T35 which outputs negative voltage of the second phase; inverse-conversion switching element T36 which outputs negative voltage of the third phase); and a plurality of regeneration diodes which is provided in parallel to the inverse-conversion switching elements T31, T32, T33, T34, T35, T36 and can flow electrical current in the inverse direction (regeneration diode D31 provided in parallel to the inverse-conversion switching element T31 and flowing positive electrical current of the first phase; regeneration diode D32 provided in parallel to the inverse-conversion switching element T32 and flowing positive electrical current of the second phase; regeneration diode D33 provided in parallel to the inverse-conversion switching element T33 and flowing positive electrical current of the third phase; regeneration diode D34 provided in parallel to the inverse-conversion switching element T34 and flowing negative electrical current of the first phase; regeneration diode D35 provided in parallel to the inverse-conversion switching element T35 and flowing negative electrical current of the second phase; regeneration diode D36 provided in parallel to the inverse-conversion switching element T36 and flowing negative electrical current of the third phase).

The inverse-conversion switching elements T31, T32, T33, T34, T35 and T36 can be configured by semiconductor switching elements such as FET, and the ON/OFF state is controlled by the control circuit 4 described later. The regeneration diodes D31, D32, D33, D34, D35 and D36 can serve dual purposes also as diodes which protect the inverse-converse switching elements T31, T32, T33, T34, T35, T36 from inverse voltage.

The control circuit 4 can be established as a configuration having a microprocessor. The control circuit 4 acquires the information required for control of the step-down circuit 2 and inverse-conversion circuit 3 from the power voltage monitor A1, input voltage monitor A2, output current monitor A3 and output voltage monitor A4. It should be noted that, for simplification, in the circuit diagram, the circuit configuration of the control circuit 4 and each monitor A1 to A4 are omitted from illustration, and the signal lines between the control circuit 4 and the step-down circuit 2 and inverse-conversion circuit 3 necessitated for control, and each monitor A1 to A4, for example, the signal lines for controlling the step-down switching elements T11, T22 and boosting switching elements T21, T22, etc., are collectively shown as a line having a single arrow between the step-down circuit 2, inverse-conversion circuit 3 and the control circuit 4.

The control circuit 4, by controlling the switching of the step-down switching elements T11, T12, boosting switching elements T21, T22, and inverse-conversion switching elements T31, T32, T33, T34, T35 and T36, performs powered running which converts the direct current supplied from the power source S to the input side of the step-down circuit 2 into alternating current of low voltage, and supplies from the inverse-conversion circuit 3 to the motor M; and regenerative running which converts the alternating current from the motor M on the output side of the inversion-conversion circuit 3 into direct current of high voltage, and supplies to the power source S from the input side of the step-down circuit 2.

During powered running, the control circuit 4 retains the boosting switching elements T21, T21 in the OFF state, and controls the switching of the plurality of step-down switching elements T11, T22 so that the output voltage of the step-down circuit 2 (output capacitors C21, C22) become the desired voltage. In addition, during powered running, the control circuit 4 controls the switching of the plurality of inverse-conversion switching elements T31, T32, T33, T34, T35 and T36, so that the inverse-conversion circuit 3 outputs alternating current of the frequency set externally. Furthermore, the control circuit 4 controls the switching of the boosting switching elements T21, T22 so that the potential of the intermediate point of the output capacitors C21, C22 becomes a predetermined potential or potential within a predetermined range.

The output voltage of the step-down circuit 2 can be adjusted by PWM (Pulse Width Modulation) control which changes the duty (ratio of time turned ON) of the step-down switching elements T11, T12. By adjusting the output voltage of the step-down circuit 2 to the peak value of the three-phase AC voltage supplied from the inverse-conversion circuit 3 to the motor M, the inverse-conversion circuit 3 can output three-phase alternating current of the appropriate voltage.

The potential of the intermediate point of the output capacitors C21, C22 can be adjusted by making the duty of the step-down switching element T11 on the positive side and the duty of the step-down switching element T12 on the negative side to differ. By appropriately adjusting the potential of the intermediate point of the output capacitors C21, C22, it is possible to stabilize the neutral point potential of three-phase current supplied to the motor M, and possible to make the dielectric voltage required by the motor M smaller.

During regenerative running, the control circuit 4 controls the switching of the plurality of boosting switching elements T21, T22 so that the electrical current supplied from the inverse-conversion circuit 3 to the step-down circuit 2 becomes a predetermined value. The electrical current supplied from the inverse-conversion circuit 3 to the step-down circuit 2 can be adjusted by PWM control which changes the duties of the boosting switching elements T21, T22. By adjusting the duties of the boosting switching elements T21, T22, it is possible to adjust the electrical current flowing from the output capacitors C21, C22 to the inductors L1, L2. Since the voltages of the output capacitors C21, C21 are thereby changed, it is possible to adjust the electrical current supplied to the step-down circuit 2 from the motor M via the inverse-conversion circuit 3. It is thereby possible to prevent overcurrent of the motor M and protect the motor M.

The power supply 1 according to the present embodiment can output alternating current of a predetermined voltage (voltage corresponding to rated voltage of motor M) which is lower than the voltage of the primary power source S and any frequency, by including the step-down circuit 2, inverse-conversion circuit 3 and control circuit 4.

In addition, since the step-down circuit 2 has the boosting switching elements T21, T22, and the inverse-conversion circuit 3 has the regeneration diodes D31, D32, D33, D34, D35 and D35, in the case of the motor M operating as a generator, the power supply 1 according to the present embodiment can boost the power generated by the motor to the voltage of the primary power source S, and supply to the primary power source S.

In addition, in the power supply 1, the step-down circuit 2 can supply the appropriate power to the primary power source S, due to having the pair of positive/negative input capacitors C11, C22, and particularly since the voltage on the input side is stabilized during regenerative running.

Figure 2:
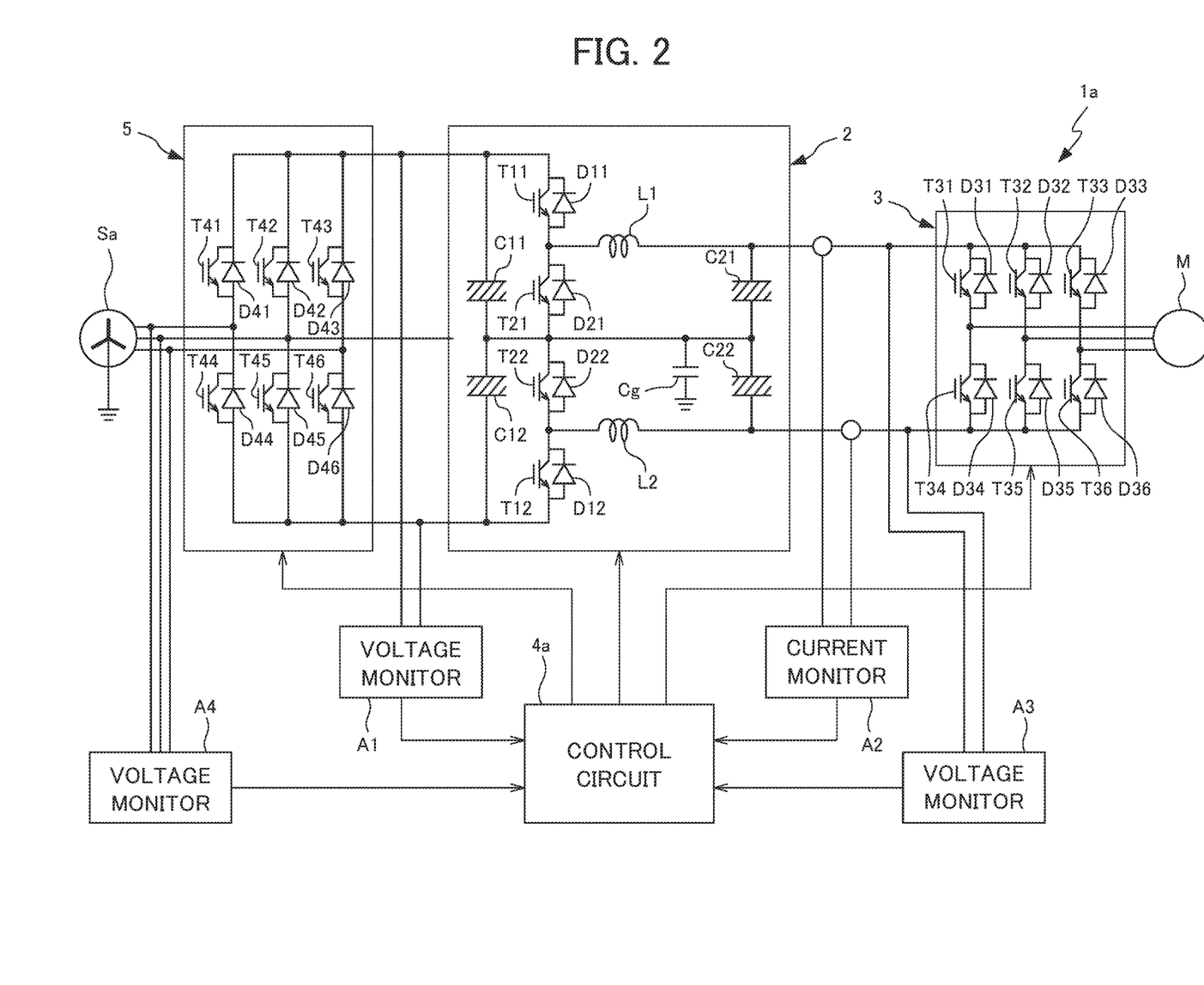
FIG. 2 is a circuit diagram showing the configuration of a power supply according to a second embodiment of the present disclosure.

FIG. 2 is a circuit diagram showing the configuration of a power supply 1a according to a second embodiment of the present disclosure. For the power supply 1a in FIG. 2, the same reference symbols will be assigned to constituent elements which are the same as the power supply 1 in FIG. 1, and redundant explanations will be omitted.

The power supply 1a of the present embodiment is a device which converts the three-phase alternating current supplied from the primary power source (AC power source) Sa into three-phase alternating current having different voltage and frequency, and supplies (powered running) to the load (motor M in the present embodiment). In more detail, the power supply 1a is connected to the primary power source Sa which is grounded to the neutral point having a voltage of at least the rated voltage of the motor M, converts the three-phase alternating current of the primary power source Sa into three-phase alternating current having a voltage equal to the rated voltage of the motor M, and frequency equal to the frequency set by external equipment or a user, and supplies to the motor M. In addition, the power supply 1a of the present embodiment is configured so as to be able to convert the three-phase alternating current supplied from the motor M in the inverse direction into three-phase alternating current having a voltage and phase equal to the primary power source Sa, and supply to the primary power source Sa (regenerative running).

The power supply 1a includes: a forward-conversion circuit 5 which extracts positive voltage and negative voltage from the primary power source Sa; the step-down circuit 2 which steps down the voltage inputted from the forward-conversion circuit 5 and outputs; the inverse-conversion circuit 3 which outputs alternating current of a desired frequency by inverse-converting the output of the step-down circuit 2 to alternating current; and the control circuit 4a which controls the forward-conversion circuit 5 and inverse-conversion circuit 3. In other words, the power supply 1a of the present embodiment is a configuration made by adding the forward-conversion circuit 5 to the power supply 1 of the first embodiment, and adding a function of controlling the forward-conversion circuit 5 to the control circuit 4a.

The forward-conversion circuit 5 has a plurality of forward-conversion diodes which extract the positive voltage and negative voltage from each phase of the three-phase AC primary power source Sa (forward-conversion diode D41 which extracts positive voltage of the first phase; forward-conversion diode D42 which extracts positive voltage of the second phase; forward-conversion diode D43 which extracts positive voltage of the third phase; forward-conversion diode D44 which extracts negative voltage of the first phase; forward-conversion diode D45 which extracts negative voltage of the second phase; forward-conversion diode D46 which extracts negative voltage of the third phase). In other words, the forward-conversion circuit 5 is a so-called three-phase diode bridge circuit.

In addition, the forward-conversion circuit 5 further has a plurality of regenerative switching elements T41, T42, T43, T44, T45 and T46 provided in parallel with the forward-conversion diodes D41, D42, D43, D44, D45 and D46. The regenerative switching elements T41, T42, T43, T44, T45 and T46, for example, are configured by semiconductor switching elements such as the FET illustrated, and the ON/OFF state is controlled by the control circuit 4a.

The forward-conversion circuit 5 converts the direct current outputted from the step-down circuit 2 to the input side during regenerative running into AC voltage synchronous with the primary power source Sa, and supplies to the primary power source Sa. For this reason, the control circuit 4a, in addition to control of the power supply 1 in FIG. 1, acquires information of the voltage and phases of the primary power source Sa from the voltage monitor A4 during regenerative running, and controls the regenerative switching elements T41, T42, T43, T44, T45 and T46 so as to supply positive/negative electrical current to each phase synchronously with the primary power source Sa.

The power supply 1a of the present embodiment, due to including the forward-conversion circuit 5, can rectify the three-phase alternating current supplied from the primary power source 1a and supply to the step-down circuit 2, then step-down to the voltage matching the motor M with the step-down circuit 2, and then inverse convert and output to the three-phase alternating current of any frequency by way of the inverse-conversion circuit 3. In addition, the power supply 1a of the present embodiment can supply the power generated by the motor M to the primary power source Sa, due to the forward-conversion circuit 5 having the regenerative switching elements T41, T42, T43, T44, T45 and T46.

Figure 3:
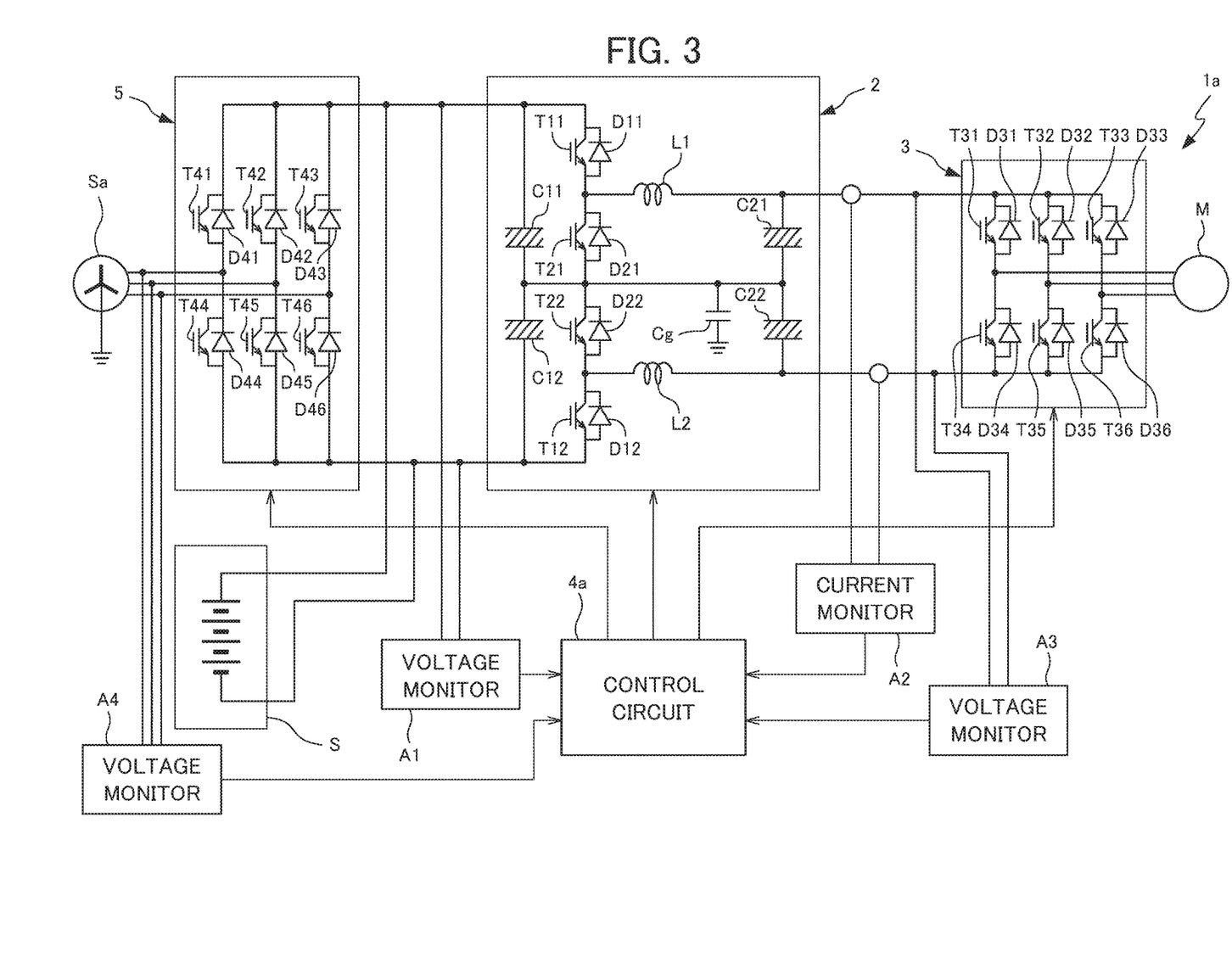
FIG. 3 is a circuit diagram showing a different usage example of the power supply in FIG. 2.

FIG. 3 is a circuit diagram showing a different usage example of the power supply 1a in FIG. 2. In the power supply 1a in FIG. 3, the primary power source Sa of three-phase alternating current is connected to the input side of the forward-conversion circuit, and the primary power source S of direct current is connected to the input side of the step-down circuit 2.

In this way, as well as the power being suppliable from both the primary power source S of direct current and the primary power source Sa of three-phase alternating current, the power supply 1a can supply the power generated by the motor M in the inverse direction to both the primary power source S of direct current and the primary power source Sa of three-phase alternating current.

Figure 4:
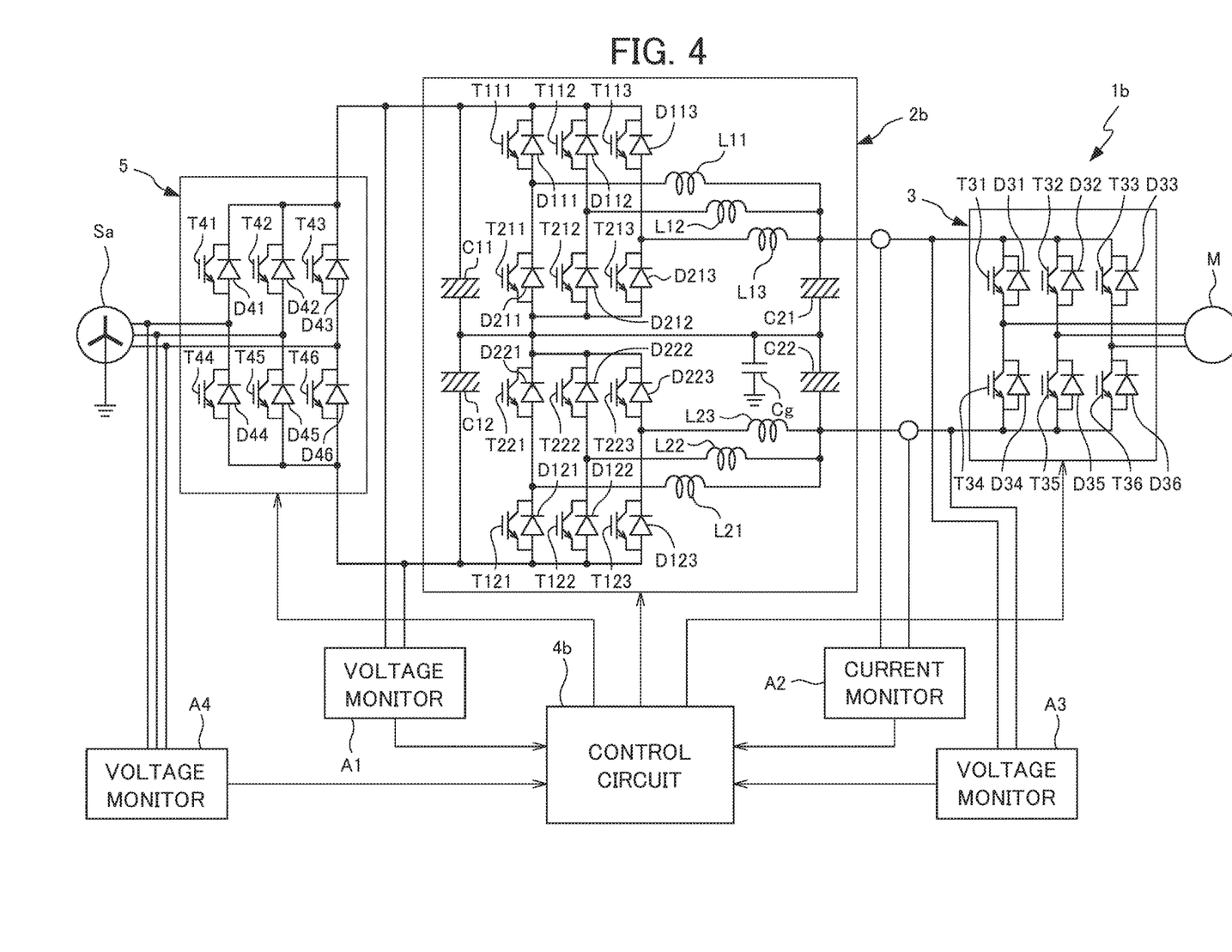
FIG. 4 is a circuit diagram showing the configuration of a power supply according to a third embodiment of the present disclosure.

FIG. 4 is a circuit diagram showing the configuration of a power supply 1b according to a third embodiment of the present disclosure. The power supply 1b of the present embodiment, similarly to the power supply 1a in FIG. 2, can convert the three-phase alternating current supplied from the primary power source (AC power source) Sa into three-phase alternating current of different voltage and frequency, and supply to the motor M, and can convert the three-phase alternating current supplied from the motor M in the inverse direction into three-phase alternating current of the equal voltage and phase as the primary power source Sa, and supply to the primary power source Sa.

The power supply 1b of the present embodiment includes: a forward-conversion circuit 5 which extracts positive voltage and negative voltage from the primary power source Sa; the step-down circuit 2b which steps down the voltage inputted from the forward-conversion circuit 5 and outputs; the inverse-conversion circuit 3 which outputs alternating current of the desired frequency by inverse converting the output of the step-down circuit 2b into alternating current; and the control circuit 4b which controls the forward-conversion circuit 5 and inverse-conversion circuit 3. The power supply 1b in FIG. 4 has the differing points of the configuration of the step-down circuit 2b differing from the configuration of the step-down circuit 2 of the power supply 1a in FIG. 2, and accompanying this, the contents of control of the control circuit 4b differing from the contents of the control circuit 4a of the power supply 1a in FIG. 2.

The step-down circuit 2b includes: a pair of input capacitors C11, C12 having equal capacities, connected to each other in series, and charged by the output electrical current of the forward-conversion circuit 5; three pairs of positive/negative step-down switching elements to which the voltage of the input capacitors C11, C12 is applied (three step-down switching elements T111, T112, T113 having input sides connected to each other and to which positive voltage is applied; and three step-down switching elements T121, T122, T123 having input sides connected to each other and to which negative voltage is applied); three pairs of positive/negative inductors having equal inductance connected to the outputs sides of the step-down switching elements T111, T112, T113, T121, T122, T123, respectively, and to which voltage is applied via the step-down switching elements T111, T112, T113, T121, T122, T123 (inductors L11, L12, L13 to which positive voltage is applied via the step-down switching elements T111, T112, T113 on the positive side; inductors L21, L22, L23 to which negative voltage is applied via the step-down switching elements T121, T122, T123 on the negative side); a pair of positive/negative output capacitors C21, C22 having equal capacities connected to each other in series and charged by way of the electrical current flowing through the inductors L11, L12, L13 on the positive side or inductors L21, L22, L23 on the negative side; three pairs of boosting switching elements (boosting switching element T211 connecting the intermediate point of the first step-down switching element T111 on the positive side and the first inductor L11 to the intermediate point of the output capacitors C21, C22; boosting switching element T212 connecting the intermediate point of the second step-down switching element T112 on the positive side and the second inductor L12 to the intermediate point of the output capacitors C21, C22; boosting switching element T213 connecting the intermediate point of the third step-down switching element T113 on the positive side and the third inductor L13 to the intermediate point of the output capacitors C21, C22; boosting switching element T221 connecting the intermediate point of the first step-down switching element T121 on the negative side and the first inductor L21 to the intermediate point of the output capacitors C21, C22; boosting switching element T222 connecting the intermediate point of the second step-down switching element T122 on the negative side and the second inductor L22 to the intermediate point of the output capacitors C21, C22; boosting switching element T223 connecting the intermediate point of the third step-down switching element T123 on the negative side and the third inductor L23 to the intermediate point of the output capacitors C21, C22) able to connect between the step-down switching elements T111, T112, T113, T121, T122, T123 and inductors L11, L12, L13, L21, L22, L23 to the intermediate point of the pair of output capacitors C21, C22; three bypass diodes D111, D112, D113, D121, D122, D123 provided in parallel respectively to the step-down switching elements T111, T112, T113, T121, T122, T123 and able to flow electrical current in the inverse direction; three pairs of protective diodes D211, D212, D213, D221, D222, D223 provided in parallel respectively to the boosting switching elements T211, T212, T213, T221, T222, T223, and able to flow electrical current in the inverse direction; and a grounding capacitor Cg which grounds the intermediate point of the input capacitors C11, C12 and the intermediate point of the output capacitors C21, C22.

During powered running, the control circuit 4b turns ON/OFF the step-down switching elements T111, T112 and T113 on the positive side at a different timing shifting the phase within a cycle of PWM control. The negative-side step-down switching elements T121, T122 and T123 are preferably turned ON/OFF in the same phase as the positive-side step-down switching elements T111, T112 and T113 which respectively form pairs (permitting a minute shift in timing for electric potential adjustment of the intermediate point of the input capacitors C11, C12 and the intermediate point of the output capacitors C21, C22). By shifting the timing of the switching of the step-down switching elements T111, T112, T113, T121, T122 and T123 in this way, it is possible to distribute the switching noise, and reduce the noise level compared to a case of controlling the electrical current by way of a single switching element. Similarly, the control circuit 4b reduces the noise level by shifting the phases of switching of the boosting switching elements T211, T212, T213, T221, T222 and T223 during regenerative running.

In addition, by providing the plurality of pairs of step-down switching elements T111, T112, T113, T121, T122, T123 and plurality of pairs of boosting switching elements T211, T212, T213, T221, T222, T223, since the electrical current flowing to each element becomes smaller, it also becomes possible to realize more rapid operation, and reduce the size of the power supply 1b. Furthermore, by using the plurality of pairs of step-down switching elements T111, T112, T113, T121, T122, T123 and plurality of pairs of boosting switching elements T211, T212, T213, T221, T222, T223, it is also possible to stabilize the voltage by a reduction in ripple voltage, and stabilize operation by dispersing heat generation.

Figure 5:
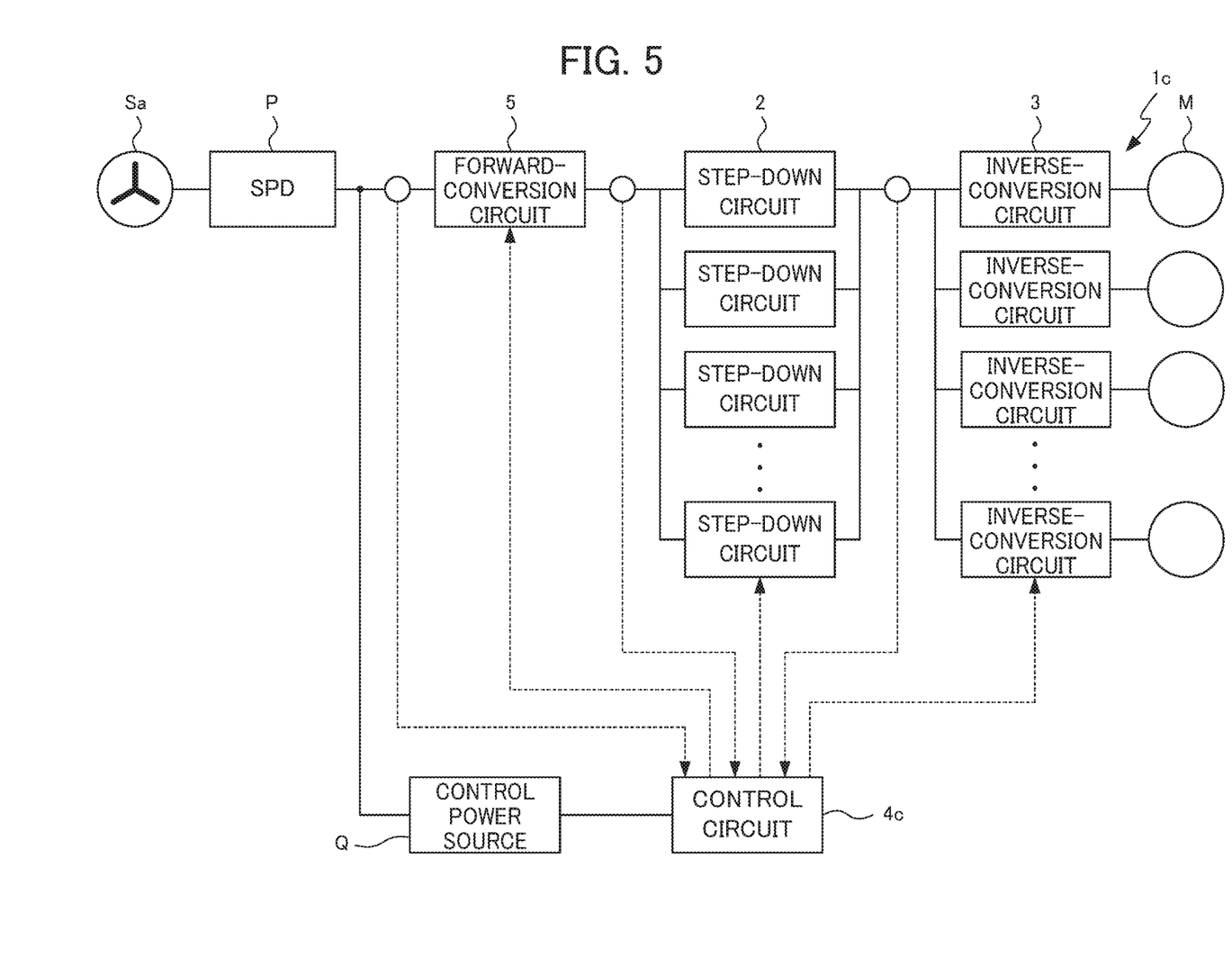
FIG. 5 is a block diagram showing the configuration of a power supply according to a fourth embodiment of the present disclosure.

FIG. 5 is a block diagram showing the configuration of a power supply 1c according to a fourth embodiment of the present disclosure. The power supply 1c of the present embodiment is configured so as to be able to convert the three-phase alternating current supplied from the primary power source (AC power source) Sa via a lightning arrestor (Surge Protective Device) P into three-phase alternating current of different voltage and frequency, and supply to a plurality of loads (motors M); and be able to convert the power supplied in the inverse direction from the load into three-phase alternating current of equal voltage and phase as the primary power source Sa, and supply to the primary power source Sa.

The power supply 1c of the present embodiment includes: the forward-conversion circuit 5 which extracts the positive voltage and negative voltage from the three-phase alternating current supplied by the primary power source Sa; a plurality of step-down circuits 2 which is connected in series and step down voltage inputted from the forward-conversion circuit 5 and output; a plurality of inverse-conversion circuits 3 which respectively output alternating current of the desired frequency by inverse-converting the output of the step-down circuits 2 into alternating current; and the control circuit 4c which controls the forward-conversion circuit 5 and inverse-conversion circuit 3. In addition, FIG. 5 shows together the control power source Q for the control circuit 4c. The power supply 1c in FIG. 5 is configured so as to be provided with a plurality of the step-down circuits 2 and inverse-conversion circuits 3 of the power supply 1a in FIG. 2, and the control circuit controls operation of the respective step-down circuits 2 and the respective inverse-conversion circuits 3.

The power supply 1c can separately set each of the drive frequencies of the plurality of motors M. In addition, the power supply 1c, in the case of the number of motors M wanted to be driven increasing, can independently drive each of the motors M by adding the inverse-conversion circuit 3. Furthermore, the power supply 1c, in the case of the total capacity of motors M increasing, can supply at least the rated power simultaneously to all of the motors M, by adding the step-down circuit 2.

Figure 6:
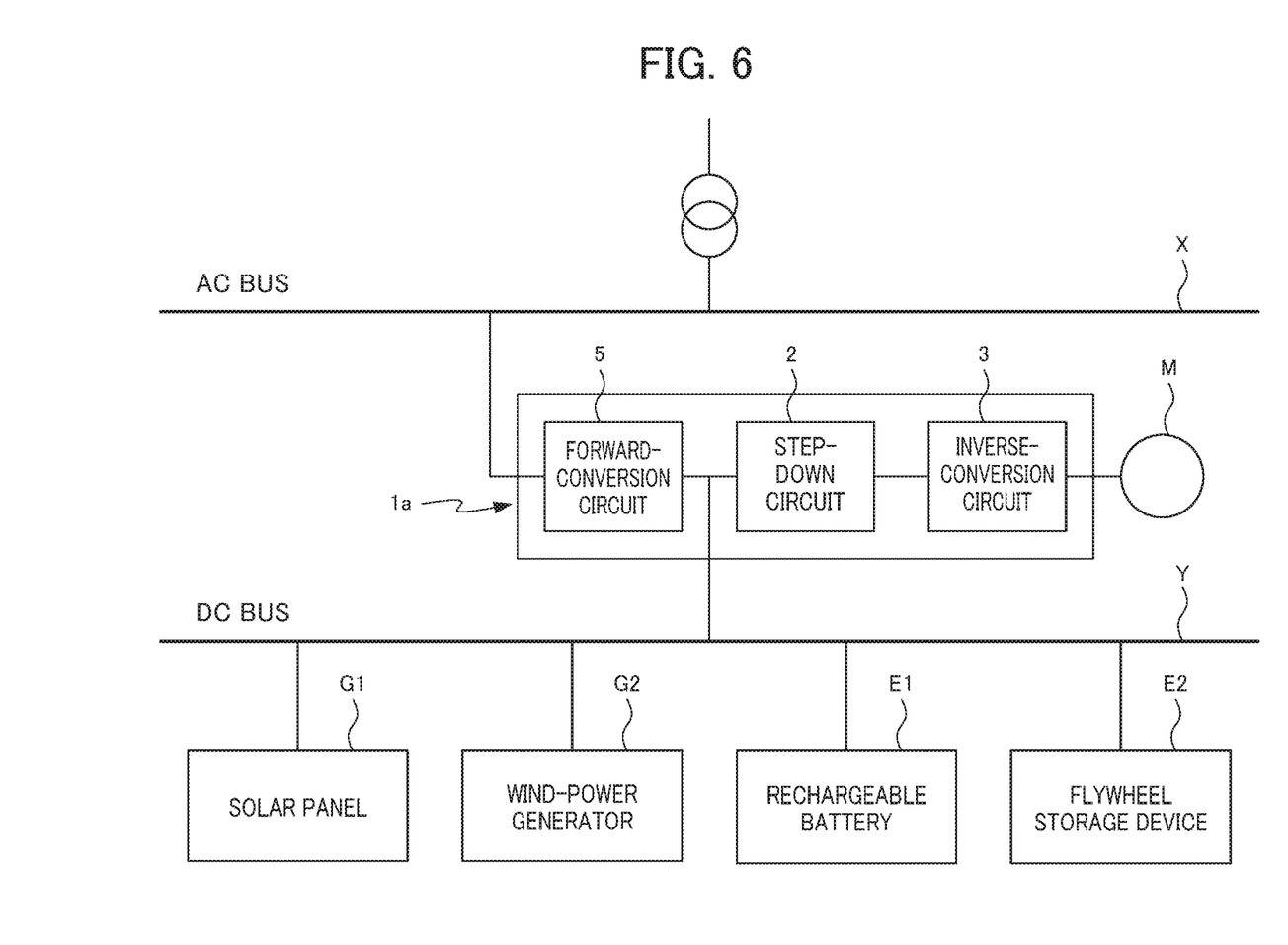
FIG. 6 is a block diagram showing the configuration of a power system according to an embodiment of the present disclosure.

FIG. 6 shows the configuration of a power system according to an embodiment of the present disclosure. This power system includes: an AC circuit having an AC bus (AC distribution network) X; a DC circuit having a DC bus (DC distribution network) Y; and the power supply 1a in FIG. 2 connected to the AC circuit and DC circuit. More specifically, three-phase alternating current is supplied from the AC bus X of the AC circuit to the input side of the forward-conversion circuit 5 of the power supply 1a, and the direct current is supplied from the DC bus Y of the DC circuit to the input side of the step-down circuit 2 of the power supply 1a. In other words, this power system is made by substituting the AC power source Sa in the AC power network, and substituting the DC power source S in the DC power network of the power supply 1a in FIG. 3.

As the AC bus X, an on-premise distribution network is assumed which transforms high-voltage three-phase alternating current supplied from a power company into low-voltage three-phase alternating current and supplying. On the other hand, as the DC bus Y, a power generator such as a solar panel generation module G1 or wind power generator G2, and a storage device such as a rechargeable battery E1 or flywheel E2 are connected thereto.

The power system according to the present embodiment can supply voltage lower than the AC bus X and DC bus Y and alternating current of the desired frequency to the motor M, in accordance with the specification of the motor (load) M. In addition, the power system according to the present embodiment can use the motor M as a power generator, and boost the power generated by the motor M and supply to the AC bus X and DC bus Y.

Although an embodiment of the present disclosure has been explained above, the present disclosure is not limited to the aforementioned embodiment. In addition, the effects described in the present embodiment are merely listing the most preferred effects produced from the present disclosure, and the effects from the present disclosure are not limited to those described in the present embodiment.

In the power supply of the above-mentioned embodiment, the configuration for regenerative running may be omitted. In addition, in the power supply of the above-mentioned embodiment, the grounded capacitor also can be omitted. The power supply according to the present disclosure may be used in order to supply AC power to a load other than a motor.

With the aforementioned power supply according to the third embodiment, the step-down circuit has three pairs of each of the step-down switching element, inductor and boosting switching element; however, the step-down circuit may have two pairs or four or more pairs of each of the step-down switching element, inductor and boosting switching element.

The power system according to the present disclosure may be a configuration in which the power supply does not have a forward-conversion circuit, and is connected only to a DC circuit.

EXPLANATION OF REFERENCE NUMERALS 1, 1a, 1b, 1c power supply
2, 2b step-down circuit
3 inverse-conversion circuit
4, 4a, 4b, 4c control circuit
5 forward-conversion circuit
C11, C12 input capacitor
C21, C22 output capacitor
Cg grounded capacitor
D31, D32, D33, D34, D35, D36 regeneration diode
D41, D42, D43, D44, D45, D46 forward-conversion diode
L1, L2, L11, L12, L13, L21, L22, L23 inductor
S, Sa primary power source
T11, T12, T111, T112, T113, T121, T122, T123 step-down switching element
T21, T22, T211, T212, T213, T221, T222, T223 boosting switching element
T31, T32, T33, T34, T35, T36 inverse-conversion switching element
T41, T42, T43, T44, T45, T46 regeneration switching element
X AC bus
Y DC bus

What is claimed is:

1. A power supply comprising:
a step-down circuit which has at least one pair of positive/negative step-down switching elements; at least one pair of positive/negative inductors to which voltage is applied via the step-down switching element, and one pair of positive/negative output capacitors which are connected in series and charged by electrical current passing through the inductors, and steps down input voltage and then outputs;
an inverse-conversion circuit which has a plurality of inverse-conversion switching elements, and inverse-converts output voltage of the step-down circuit into alternating current; and
a control circuit which controls switching of the plurality of step-down switching elements so that the output voltage of the step-down circuit becomes a desired voltage and which adjusts a potential of an intermediate point of the pair of positive/negative output capacitors by making the duty cycle of the step-down switching elements on the positive side and the duty cycle of the step-down switching elements on the negative side to differ.

2. The power supply according to claim 1,
wherein the step-down circuit further has at least one pair of boosting switching elements capable of connecting between the step-down switching element and the inductors to the intermediate point of the one pair of output capacitors,
wherein the inverse-conversion circuit further has a plurality of regeneration diodes which is provided in parallel with the inverse-conversion switching element, and can flow electrical current in an inverse direction, and
wherein the control circuit, in a case of electrical current being supplied from an output side of the inverse-conversion circuit, controls switching of the plurality of boosting switching elements so that electrical current supplied from the inverse-conversion circuit to the step-down circuit becomes a predetermined value.

3. The power supply according to claim 1, wherein the step-down circuit further has one pair of positive/negative input capacitors connected in series, and
wherein the at least one pair of step-down switching elements is applied with voltage of the input capacitor.

4. The power supply according to claim 1, further comprising a forward-conversion circuit which has a plurality of forward-conversion diodes that extract positive voltage and negative voltage from a primary power source of three-phase alternating current, and inputs DC voltage to the step-down circuit.

5. The power supply according to claim 1, wherein the step-down circuit has a plurality of pairs of each of the step-down switching element and the inductors, and
wherein the control circuit switches a plurality of pairs of the step-down switching elements at different timings.

6. A power system comprising:
the power supply according to claim 1; and
a DC circuit connected to an input side of the step-down circuit.

7. A power supply comprising:
a step-down circuit which has at least one pair of positive/negative step-down switching elements; at least one pair of positive/negative inductors to which voltage is applied via the step-down switching element, and one pair of positive/negative output capacitors which are connected in series and charged by electrical current passing through the inductors, and steps down input voltage and then outputs;
an inverse-conversion circuit which has a plurality of inverse-conversion switching elements, and inverse-converts output voltage of the step-down circuit into alternating current;
a control circuit which controls switching of the plurality of step-down switching elements so that the output voltage of the step-down circuit becomes a desired voltage; and
a forward-conversion circuit which has a plurality of forward-conversion diodes that extract positive voltage and negative voltage from a primary power source of three-phase alternating current, and inputs DC voltage to the step-down circuit.

* * * * *